United States Patent [19]
Oortwijn et al.

[11] Patent Number: 5,931,978
[45] Date of Patent: Aug. 3, 1999

[54] PROCESS FOR PREPARING SYNTHESIS GAS

[75] Inventors: Peter Oortwijn, The Hague; Hendrik Martinus Wentinck, Amsterdam, both of Netherlands

[73] Assignee: Shell Oil Company, Houston, Tex.

[21] Appl. No.: 08/721,405

[22] Filed: Sep. 26, 1996

[30] Foreign Application Priority Data

Dec. 18, 1995 [EP] European Pat. Off. ............. 95203535

[51] Int. Cl.$^6$ .............................. C01B 3/24; F23D 14/20; F23D 14/46
[52] U.S. Cl. ................. 48/127.1; 48/198.1; 48/198.7; 431/350; 431/354; 431/356
[58] Field of Search ................. 48/127.1, 198.1, 48/198.7; 431/350, 354, 356

[56] References Cited

U.S. PATENT DOCUMENTS

| 4,436,508 | 3/1984 | Van Den Bemt | 432/214 |
| 4,858,538 | 8/1989 | Kuypers et al. | 110/264 |

*Primary Examiner*—Mary E. Mosher

[57] ABSTRACT

A process is provided for preparing synthesis gas by partial oxidation of a hydrocarbon-containing fuel in the absence of moderator gas. A hydrocarbon-containing fuel and an oxidiser are supplied through a reactor mix type burner to a gasification zone under oxygen blast conditions. At least the rim(s) of the burner internal(s) separating the fuel from the oxidiser at the rim tip(s) is (are) made of, or lined with, a ceramic material or a noble metal or a noble metal alloy.

10 Claims, 1 Drawing Sheet

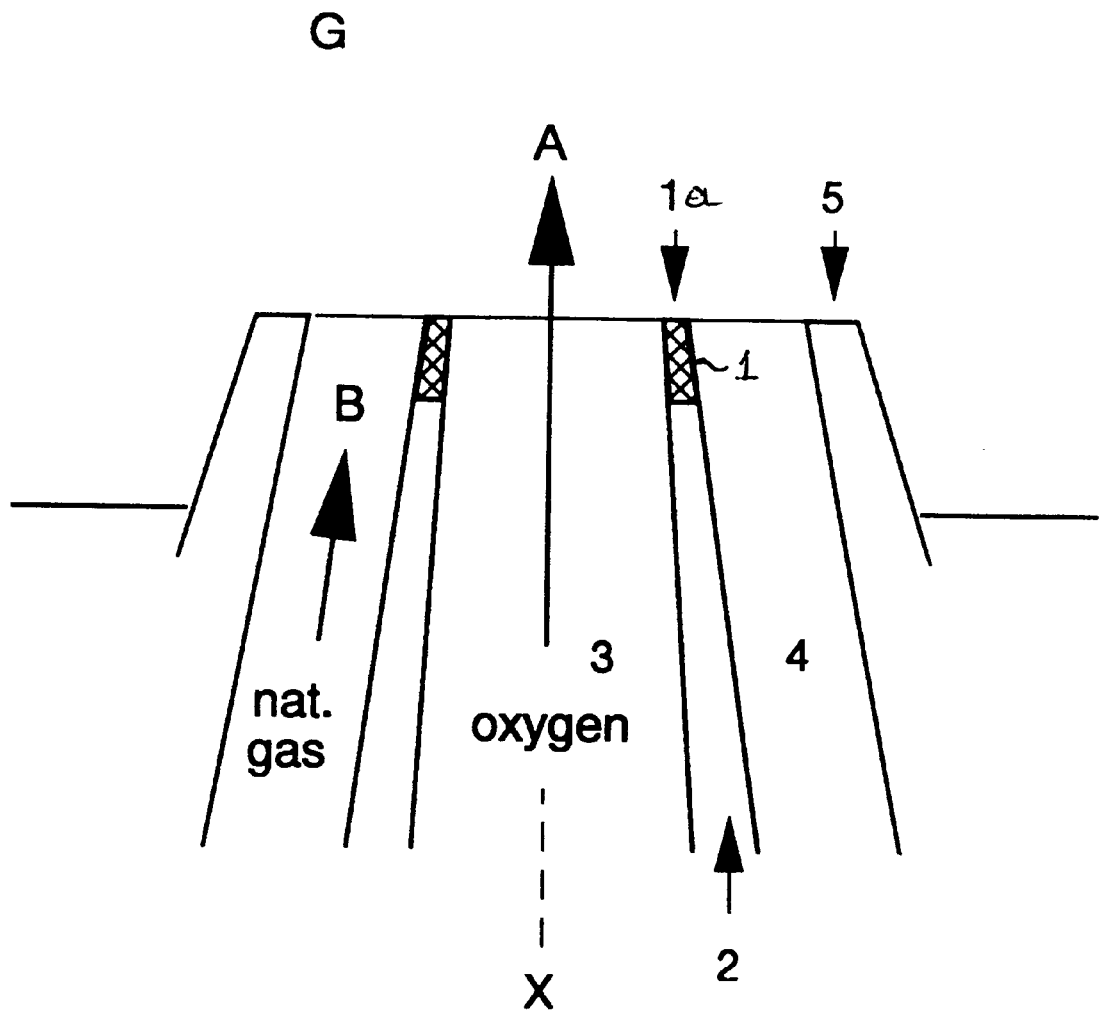
FIG.

PROCESS FOR PREPARING SYNTHESIS GAS

FIELD OF THE INVENTION

The present invention relates to a process for preparing synthesis gas by partial oxidation of a hydrocarbon-containing fuel and an oxygen-containing gas in the absence of moderator gas. In particular, liquid or gaseous hydrocarbon-containing fuel is applied.

BACKGROUND

In such a process for preparing synthesis gas an oxygen-containing gas, which is applied as an oxidiser, and a hydrocarbon-containing fuel are supplied to a gasification zone through a burner comprising an arrangement of passages or channels for fuel and oxidiser, and wherein autothermically a gaseous stream containing synthesis gas is produced under appropriate conditions. The passages or channels are separated from each other by separation walls, the so-called burner internals.

In many known processes for preparing synthesis gas a moderator gas (for example steam, water or carbon dioxide or a combination thereof) is supplied to the gasification zone in order to control the temperature in the gasification zone. Moderator gas may be added to the oxidiser or (gaseous) fuel or may be supplied via a moderator gas passage. Those skilled in the art will know the conditions of applying oxidiser and moderator gas.

Advantageously, a multi-orifice (co-annular) burner comprising a concentric arrangement of n passages or channels co-axial with the longitudinal axis of said burner, wherein n is an integer >2, is applied.

Such multi-orifice (co-annular) burners contain substantially cylindrical internals which separate the fluid streams flowing through the passages until they reach the burner exit. In particular, such multi-orifice (co-annular) burners comprise an arrangement of annular concentric channels or passages for supplying oxidiser, moderator gas (optionally) and fuel to the gasification zone.

Multi-orifice (co-annular) burners are known as such and the mechanical structures thereof will therefore not be described in detail.

Usually such burners comprise a number of slits at the burner outlet and hollow wall members with internal cooling fluid (e.g. water) passages. The passages may or may not be converging at the burner outlet. Instead of comprising internal cooling fluid passages, the burner may be provided with a suitable ceramic or refractory lining applied onto or suspended by a means closely adjacent to the outer surface of the burner (front) wall for resisting the heat load during operation or heat-up/shut down situations of the burner. Advantageously, the exit(s) of one or more passages may be retracted or protruded with respect to the outer passage.

It will be appreciated by those skilled in the art that any slit width suitable for the purpose can be applied, dependent on the burner capacity.

Advantageously, the central passage has a diameter up to 70 mm, whereas the remaining concentric passages have slit widths in the range of 1–30 mm.

However, it will be appreciated that the present application is not confined to the use of co-annular burners.

The oxidiser and the fuel and, optionally, moderator gas are supplied to the gasification zone through the respective channels at specific velocities and mass distribution in order to obtain a good atomization and mixing.

Advantageously the respective velocities are measured or calculated at the outlet of the said respective channels into the gasification zone. The velocity measurement or calculation can be carried out by those skilled in the art in any way suitable for the purpose and will therefore not be described in detail.

The oxygen-containing gas, which is applied as oxidiser, is usually air or oxygen or a mixture thereof. An oxidiser comprising at least 95% oxygen is preferred.

Synthesis gas is a gas comprising carbon monoxide and hydrogen, and it is used, for example, as a clean medium-calorific value fuel gas or as a feedstock for the synthesis of methanol, ammonia or hydrocarbons, which latter synthesis yields gaseous hydrocarbons and liquid hydrocarbons such as gasoline, middle distillates, lub oils and waxes.

In the specification and in the claims the term gaseous (liquid) hydrocarbon-containing fuel will be used to refer to hydrocarbon-containing fuel that is gaseous (liquid) at gasifier feed pressure and temperature.

According to an established process, synthesis gas is produced by partially oxidising in a reactor vessel a gaseous fuel such as a gaseous hydrocarbon, in particular petroleum gas or natural gas, at a temperature in the range of from 1000° C. to 1800° C. and at a pressure in the range of from 0.1 MPa to 12 MPa abs. with the use of an oxidiser.

Synthesis gas will often be produced near or at a crude oil refinery because the produced synthesis gas can directly be applied as a feedstock for the production of middle distillates, ammonia, hydrogen, methanol or as a fuel gas, for example, for heating the furnaces of the refinery or more efficiently for the firing of gas turbines to produce electricity and heat.

For economic reasons it is often desirable to operate the burner without the application of a moderator gas. Further, in order to obtain a good mixing of fuel and oxidiser in the gasifier it is preferred to operate the burner under such conditions that an oxygen blast exists (i.e. the velocity of the oxidiser is substantially larger than the velocity of the fuel at the outlet of the burner). Those skilled in the art will know these conditions.

It will be appreciated by those skilled in the art that oxygen blast permits lower fuel supply pressures and enables reduction of compression cost.

Usually, the rim of a burner internal (i.e. that part of the burner internal which, when the burner is mounted in a reactor vessel, is directed to the gasification zone and terminates in a tip) is made of steel or low alloy steel.

However, when applying oxygen blast in the absence of moderator gas it has appeared that the rim(s) of the burner internal(s) separating fuel and oxidiser is (are) severely attacked by metal dusting phenomena so that serious burner damage will occur and the burner lifetime is restricted.

Metal dusting is a catastrophic carburization which occurs in industrial plants under conditions of high activity and low oxygen pressure in the temperature range 600–800° C., leading to decomposition of steels into a mixture of powdery carbon, metal particles and sometimes carbides and oxide. Pitting or general metal wastage is observed, if the corrosion product was carried away by erosion through the gas flow.

It is an object of the invention to provide an economically feasible process for preparing synthesis gas which can be carried out over a long period without the need for many shut downs.

SUMMARY OF THE INVENTION

The invention therefore provides a process for preparing synthesis gas by partial oxidation of a hydrocarbon-containing fuel in the absence of moderator gas, comprising the steps of:

supplying a hydrocarbon-containing fuel and an oxidiser through a reactor mix type burner to a gasification zone under oxygen blast conditions; and wherein at least the rims of the burner internals separating at least at or near theirs tips said fuel and said oxidiser are made of ceramic material or a noble metal or a noble metal alloy or wherein the rims of the burner internals separating at least at or near their tips said fuel and said oxidiser are provided at their oxidiser sides with a lining of ceramic material or noble metal or a noble metal alloy.

The invention further provides a reactor mix type burner to be used in such a process for preparing synthesis gas, said burner comprising an arrangement of at least a fuel burner passage and at least an oxidiser burner passage wherein at least the rims of the burner internals separating at least at or near their tips said fuel passage and said oxidiser passage are made of ceramic material or noble metal or a noble metal alloy or wherein the rims of the burner internals separating at least at or near their tips said fuel passage and said oxidiser passage are provided at their oxidiser sides with a lining of ceramic material or noble metal or a noble metal alloy.

BRIEF DESCRIPTION OF THE DRAWING

The figure shows a representation of a burner to be used in the process of the invention.

DETAILED DESCRIPTION

In one embodiment of the invention, there is provided a process for preparing synthesis gas by partial oxidation of a hydrocarbon-containing fuel in the absence of moderator gas. Hydrocarbon-containing fuel and an oxidiser are supplied through a reactor mix type burner to a gasification zone under oxygen blast conditions. In a reactor mix type burner, the fuel and the oxidiser flow in one or more separate burner passages debauching into the gasification zone and they are not mixed until immediately downstream of the said burner passages. Oxygen blast conditions mean the velocity of the oxidiser is substantially higher than the velocity of the fuel at the outlet of the burner. The fuel and oxidiser are separated in the burner by the burner internal(s) and at least the rim(s) least at its (their) tip(s) is (are) made of ceramic material or a noble metal or a noble metal alloy, or is (are) provided at its (their) oxidiser side(s) with a lining of ceramic material or noble metal or a noble metal alloy.

Another embodiment of the invention provides a reactor mix type burner to be used in such a process for preparing synthesis gas. The burner comprises an arrangement of at least a fuel burner passage and at least an oxidiser burner passage wherein at least the rim(s) of the burner internal(s) separating at least at or near its (their) tip(s) the fuel passage and the oxidiser passage is (are) made of ceramic material or noble metal or a noble metal alloy or wherein the rim(s) of the burner internal(s) separating at least at or near its (their) tip(s) the fuel passage and the oxidiser passage is (are) provided at its (their) oxidiser side(s) with a lining of ceramic material or noble metal or a noble metal alloy.

Advantageously, the rim(s) of the burner internal(s) separating the fuel and the oxidiser is (are) made of a Pt alloy e.g. Pt/Rh, or Pt/Ir or any ceramic material suitable for the purpose, e.g. SiC (silicon carbide) or $Si_3N_4$ (silicon nitride).

The fuel is e.g. natural gas, which advantageously comprises at least 80% $CH_4$. Advantageously, the velocity ratio between oxidiser and fuel is:

$$V_{fuel}/V_{oxidiser} = 0.25 - 0.6.$$

More advantageously, the oxidiser velocity is 50—100 m/s and the fuel velocity is 25–60 m/s (provided that the above ratio is satisfied).

When applying the process of the invention it has been found that there is no metal dusting and that the burner lifetime is at least 1600 hours.

Advantageously the rim(s) of the burner internal(s) separating the fuel and the oxidiser has (have) a length of 2–20 mm and a thickness of 0.3–1.0 mm and is (are) mechanically connected in any suitable manner to the burner internal e.g. by welding.

In another advantageous embodiment of the invention the rim(s) of the burner internal(s) separating the fuel and the oxidiser is (are) provided with a lining (e.g. a ribbon) at the oxidiser side(s) of the burner internal(s). Such a ribbon may have a length of 5–10 mm and a thickness of 0.2–0.5 mm.

The invention will now be described by way of example in more detail by reference to the drawing.

Referring to the figure, a partial longitudinal section of a burner having a central passage and an outer passage has been shown schematically. X represents the axis of the burner. The burner debouches into a gasification zone G of a reactor through a refractory dome. For reasons of clarity the burner has been shown partially only and the reactor details have not been shown. In particular, details of (water)-cooling of the burner have been omitted for reasons of clarity.

In the figure a substantially conical burner has been represented but it will be appreciated by those skilled in the art that any shape suitable for the purpose (e.g. substantially cylindrical) is possible.

A burner internal rim 1 and its tip 1a have been represented. The rim 1 is made of ceramic material (e.g. SiC or $Si_3N_4$) or noble metal (e.g. Pt) or a noble metal alloy (e.g. Pt/Rh or Pt/Ir) and is mounted on the burner internal 2 at its end directed to the gasification zone G, e.g. by welding.

Through the central passage 3 (diameter e.g. 41 mm) oxidiser is flowing whereas through the outer passage 4 fuel (e.g. natural gas) is flowing. Reference numeral 5 represents the outer passage wall. The slit width of the outer passage 4 is e.g. 25 mm.

The arrows A and B representing the velocities of the oxidiser (e.g. 100 m/s) and fuel (e.g. 50 m/s) respectively, indicate that an oxygen blast exists.

The invention will now be described by way of example in more detail by reference to Examples I and II.

EXAMPLE I (OXYGEN BLAST)

Flow conditions at the rim between fuel passage and oxidiser passage are considered. The rim is made of Pt. Oxidiser is supplied through a central passage and fuel is supplied through a concentric outer passage.

| | | | |
|---|---|---|---|
| Pressure | | 47 | bara |
| Oxidiser | | | |
| Throughput $O_2$ (>99 mol %) | | 400 | tpd |
| oxidiser temp. | | 250 | °C. |
| oxidiser density | | 35 | kg/m$^3$ |
| Fuel | | | |
| Throughput | NG | 350 | tpd |
| NG composition | $CH_4$ | 88.55 | mol % |
| | $C_2H_6$ | 3.85 | mol % |
| | $C_3H_8$ | 2.47 | mol % |
| | $C_4H_{10}$ | 1.15 | mol % |
| | $C_5H_{12}$ | 0.36 | mol % |
| | $C_6H_{18}$ | 0.24 | mol % |
| | $CO_2$ | 2.85 | mol % |

-continued

|   |   |   |   |
|---|---|---|---|
| $N_2$ | | 0.53 | |
| fuel temperature | | 400 | °C. |
| fuel density | | 16 | kg/m³ |
| burner outlet geometry: | | | |
| outer diameter oxidiser passage: 41 mm | | | |
| outer diameter fuel passage: 90 mm | | | |
| Flow conditions at the rim between fuel passage and oxidiser passage | | | |
| Fuel velocity | | 50 | m/s |
| Oxidiser velocity | | 100 | m/s |
| Fuel/Oxidiser velocity ratio | | 0.50 | |

EXAMPLE II (FUEL BLAST)

Flow conditions at the rim between fuel passage and oxidiser passage are considered. The rim is made of steel. Oxidiser is supplied through a central passage; fuel is supplied through a concentric outer passage.

|   |   |   |   |
|---|---|---|---|
| Pressure | | 47 | bara |
| Oxidiser | | | |
| Throughput $O_2$ (>99 mol %) | | 400 | tpd |
| oxidiser temp. | | 250 | °C. |
| oxidiser density | | 35 | kg/m³ |
| Fuel | | | |
| Throughput | NG | 350 | tpd |
| NG composition | $CH_4$ | 88.55 | mol % |
| | $C_2H_6$ | 3.85 | mol % |
| | $C_3H_8$ | 2.47 | mol % |
| | $C_4H_{10}$ | 1.15 | mol % |
| | $C_5H_{12}$ | 0.36 | mol % |
| | $C_6H_{18}$ | 0.24 | mol % |
| | $CO_2$ | 2.85 | mol % |
| | $N_2$ | 0.53 | |
| fuel temperature | | 400 | °C. |
| fuel density | | 16 | kg/m³ |
| burner outlet geometry: | | | |
| outer diameter oxidiser passage: 65 mm | | | |
| outer diameter fuel passage: 86 mm | | | |
| Flow conditions at the rim between fuel passage and oxidiser passage | | | |
| Fuel velocity | | 100 | m/s |
| Oxidiser velocity | | 40 | m/s |
| Fuel/Oxidiser velocity ratio | | 2.5 | |

In Example I the burner was inspected after 2300 hours of operation without moderator gas. No visible damage was detected and the burner was in good condition.

In Example II it appeared that the rim between fuel passage and oxidiser passage was severely attacked after approximately 1000 hours of operation.

Various modifications of the present invention will become apparent to those skilled in the art from the foregoing description. Such modification are intended to fall within the scope of the appended claims.

What is claimed is:

1. A process for preparing synthesis gas by partial oxidation of a hydrocarbon-containing fuel in the absence of moderator gas, comprising the steps of:

supplying a hydrocarbon-containing fuel and an oxidiser through a reactor mix type burner to a gasification zone under oxygen blast conditions; wherein said reactor mix type burner comprises burner internals having at least one rim, said at least one rim having a tip; wherein said fuel and said oxidiser are separated by said at least one rim at or near its tip; and wherein at least the rim of the burner internals is made of or is lined with a material selected from the group consisting of ceramic material, noble metal, and a noble metal alloy.

2. The process as claimed in claim 1, wherein the velocity ratio $V_{fuel}/V_{oxidiser}=0.25-0.6$.

3. The process as claimed in claim 2, wherein, under oxygen blast conditions, the velocity of the oxidiser is 50–100 m/s and the velocity of the fuel is 25–60 m/s.

4. The process as claimed in claim 1, wherein the fuel is gaseous or liquid.

5. The process as claimed in claim 4, wherein the fuel is natural gas.

6. The process as claimed in claim 5, wherein the natural gas comprises at least 80% $CH_4$.

7. The process as claimed in claim 1, wherein said rim of said at least one burner internal separating said fuel and said oxidiser is made of a material selected from the group consisting of a Pt alloy and a ceramic material.

8. The process as claimed in claim 1, wherein said rim of said at least one burner internal separating said fuel and said oxidiser has a length of 2–20 mm, and a thickness of 0.3–1.0 mm.

9. The process as claimed in claim 1, wherein the burner is a co-annular burner comprising a concentric arrangement of n passages or channels co-axial with the longitudinal axis of said burner, wherein n is an integer >2.

10. A reactor mix type burner comprising an arrangement of at least one fuel burner passage, at least one oxidiser burner passage, and burner internals having at least one rim, each said at least one rim having a tip, a length of 2–20 mm, and a thickness of 0.3–1.0 mm; wherein at least the at least one rim of the burner internals is made of or is lined with a material selected from the group consisting of ceramic material, noble metal, and a noble metal alloy.

* * * * *